(12) United States Patent
Weldemariam et al.

(10) Patent No.: US 11,148,588 B2
(45) Date of Patent: Oct. 19, 2021

(54) REDUCING RISKS FROM EMERGENCY VEHICLE LIGHTS

(71) Applicant: International Business Machines Corporation, Armonk, NY (US)

(72) Inventors: Komminist Weldemariam, Ottawa (CA); Michael S. Gordon, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 32 days.

(21) Appl. No.: 16/785,593

(22) Filed: Feb. 8, 2020

(65) Prior Publication Data
US 2021/0245656 A1    Aug. 12, 2021

(51) Int. Cl.
| | | |
|---|---|---|
| *B60Q 1/52* | (2006.01) | |
| *H05B 47/12* | (2020.01) | |
| *G06K 9/00* | (2006.01) | |
| *G06K 9/32* | (2006.01) | |
| *G06N 3/04* | (2006.01) | |
| *G06N 3/08* | (2006.01) | |

(Continued)

(52) U.S. Cl.
CPC .......... *B60Q 1/525* (2013.01); *G06F 16/532* (2019.01); *G06K 9/00275* (2013.01); *G06K 9/00288* (2013.01); *G06K 9/325* (2013.01); *G06N 3/0454* (2013.01); *G06N 3/08* (2013.01); *H05B 47/125* (2020.01); *G06K 2209/01* (2013.01); *G06K 2209/15* (2013.01)

(58) Field of Classification Search
None
See application file for complete search history.

(56) References Cited

U.S. PATENT DOCUMENTS

| | | |
|---|---|---|
| 5,625,257 A | 4/1997 | Nunn |
| 6,072,406 A | 6/2000 | Leonard et al. |

(Continued)

FOREIGN PATENT DOCUMENTS

DE    102011010947 A    2/2011

OTHER PUBLICATIONS

Flannagan et al., Effects of Warning Lamps on Pedestrian Visibility and Driver Behavior, University of Michigan Transportation Research Institute: Ann Arbor. 2007, 38 pages https://www.sae.org/standardsdev/tsb/cooperative/nblighting.pdf.
Yates, How to Safely Use Emergency Lights, PoliceOne.com, 2019, 4 pages https://www.policeone.com/police-products/emergency-lights/articles/1858042-How-to-safely-use-emergency-lights/.

(Continued)

*Primary Examiner* — Dedei K Hammond
(74) *Attorney, Agent, or Firm* — Shimon Benjamin; Otterstedt, Wallace & Kammer, LLP

(57) ABSTRACT

An emergency vehicle that is displaying emergency lights detects an approaching vehicle, and assesses road conditions, intensity of the emergency lights at the approaching vehicle, a response of the approaching vehicle to the emergency lights, and a state variable related to a driver of the approaching vehicle. The emergency vehicle then obtains a likelihood value that the approaching vehicle will initiate an accident, by supplying information about the road conditions, the intensity of the emergency lights at the approaching vehicle, the response of the approaching vehicle, and the state variable as inputs to a neural network trained to correlate accidents to such information. In response to the likelihood value exceeding a threshold value, the emergency vehicle modifies the emergency lights.

20 Claims, 7 Drawing Sheets

(51) Int. Cl.
*G06F 16/532* (2019.01)
*H05B 47/125* (2020.01)

(56) References Cited

U.S. PATENT DOCUMENTS

| | | |
|---|---|---|
| 6,556,148 B2 | 4/2003 | Ellis |
| 7,471,998 B2 | 12/2008 | Peravali et al. |
| 10,214,215 B2 | 2/2019 | Nakatsuka et al. |
| 10,237,900 B2 | 3/2019 | Jackson et al. |
| 10,286,912 B2 | 5/2019 | Nakatsuka et al. |
| 2010/0109881 A1 | 5/2010 | Eskandarian et al. |
| 2017/0161614 A1 | 6/2017 | Mehta et al. |
| 2019/0102840 A1* | 4/2019 | Perl ............... B60W 40/09 |
| 2020/0168099 A1* | 5/2020 | Yamaguchi ........ G06K 9/00805 |
| 2021/0039639 A1* | 2/2021 | Song ............... B60W 40/09 |

OTHER PUBLICATIONS

Karczewski, When Too Many Emergency Lights Threaten Provider Eyesight, Hendon Media Group, 2019, 3 pages http://www.hendonpub.com/resources/article_archive/results/details?id=1933.

Faugh, Emergency warning lights, FirefighterCloseCalls.com, 2006, 11 pages https://www.firefighterclosecalls.com/emergency-warning-lights/.

Brown, New LED's atop police cruisers too distracting, some drivers claim, 2014, 4 pages https://www.poconorecord.com/article/20131231/News/312310319.

Berry, When Too Many Emergency Lights Threaten Provider Eyesight, Journal of Emergency Medical Services, JEMS, Issue 2 and vol. 40, 2015, 3 pages https://www.jems.com/2015/01/26/when-too-many-emergency-lights-threaten-provider-eyesight/.

\* cited by examiner

REDUCING RISKS FROM EMERGENCY VEHICLE LIGHTS

BACKGROUND

The present invention relates to the electrical, electronic, and computer arts, and more specifically, to automotive applications of artificial intelligence.

Lighting on emergency vehicles (police, ambulances, fire trucks, road assistant vehicles, and the like) serve multiple purposes: to warn drivers of other motor vehicles, in conjunction with sirens that they are on their way to an emergency (fire, accident, transporting patient to a hospital), and, when stationary, to warn the drivers of other motor vehicles of hazards associated with an emergency (fire, car accident, etc.) where the emergency vehicles may be blocking a road.

There is a documented "moth" effect (like a moth drawn to a flame) by which drivers often are drawn to bright lights of emergency vehicles (e.g., lights mounted on the vehicles or deployed on a roadside). Not only does the moth effect occur, but the presence of multiple emergency vehicles coupled with surrounding conditions (e.g., reflective objects/surfaces) and weather (e.g., rain) can confuse drivers. This can lead to drivers causing further incidents, such as stopped or moving emergency vehicles being struck, other vehicles being struck, emergency personnel being hit by moving cars in the vicinity of an accident scene. These accidents are known as "secondary" accidents.

SUMMARY

Principles of the invention provide techniques for reducing risks from emergency vehicle lights. In one aspect, an exemplary method includes detecting a vehicle that is approaching an emergency vehicle, using at least one sensor of the emergency vehicle; identifying a likely driver of the approaching vehicle; estimating a likelihood value that the likely driver will cause a further incident, wherein the step of assessing estimating comprises (i) obtaining driver information, (ii) obtaining contextual information that comprises weather conditions and time of day, and (iii) processing the obtained information in a neural network that is trained to estimate the likelihood from a priori information; and, in response to the likelihood value exceeding a threshold value, modifying emergency lights of the emergency vehicle.

In another aspect, an exemplary method includes detecting a vehicle that is approaching an emergency vehicle, using a sensor of the emergency vehicle; estimating a likelihood value that the approaching vehicle will initiate a road accident; and, in response to the likelihood value exceeding a threshold value, modifying emergency lights of the emergency vehicle.

In another aspect, an exemplary method includes detecting a vehicle approaching an emergency vehicle that is displaying emergency lights; assessing road conditions affecting the approaching vehicle; assessing intensity of the emergency lights at the approaching vehicle, in response to information regarding the location, orientation, and velocity of one or more reflective surfaces; assessing a response of the approaching vehicle to the emergency lights, in response to information regarding the location, orientation, and velocity of the approaching vehicle; assessing a state variable related to a driver of the approaching vehicle; calculating a likelihood value that the approaching vehicle will initiate an accident, by supplying information about the road conditions, the intensity of the emergency lights at the approaching vehicle, the response of the approaching vehicle, and the state variable as inputs to a neural network trained to correlate accidents to such information; and, in response to the likelihood value exceeding a threshold value, modifying the emergency lights.

One or more embodiments of the invention or elements thereof can be implemented in the form of a computer program product including a computer readable storage medium with computer usable program code for facilitating the method steps indicated. Furthermore, one or more embodiments of the invention or elements thereof can be implemented in the form of a system (or apparatus) including a memory that embodies computer executable instructions, and at least one processor that is coupled to the memory and operative by the instructions to facilitate exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a tangible computer readable storage medium (or multiple such media) and implemented on a hardware processor, or (iii) a combination of (i) and (ii); any of (i)-(iii) implement the specific techniques set forth herein.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

In view of the foregoing, techniques of the present invention can provide substantial beneficial technical effects. For example, one or more embodiments provide one or more of:

Efficiently identifying and characterizing potentially unsafe conditions to predict the occurrence of secondary accidents by analyzing a plurality of data sources.

Efficiently predicting an occurrence of a secondary accident based on the analysis of the movement of one or more vehicles in a vicinity.

Efficiently controlling one or more properties of the vehicle when the occurrence of a secondary accident is predicted.

Automatically generating risk-avoidance actions for drivers based on the predicted occurrence of the secondary incidents, the current context of the driver, vehicle state, road condition, etc.

Automatically causing a vehicle to switch between modes (e.g., from non-self-driving mode to self-driving).

These and other features and advantages of the present invention will become apparent from the following detailed description of illustrative embodiments thereof, which is to be read in connection with the accompanying drawings.

DETAILED DESCRIPTION

Figure 1:
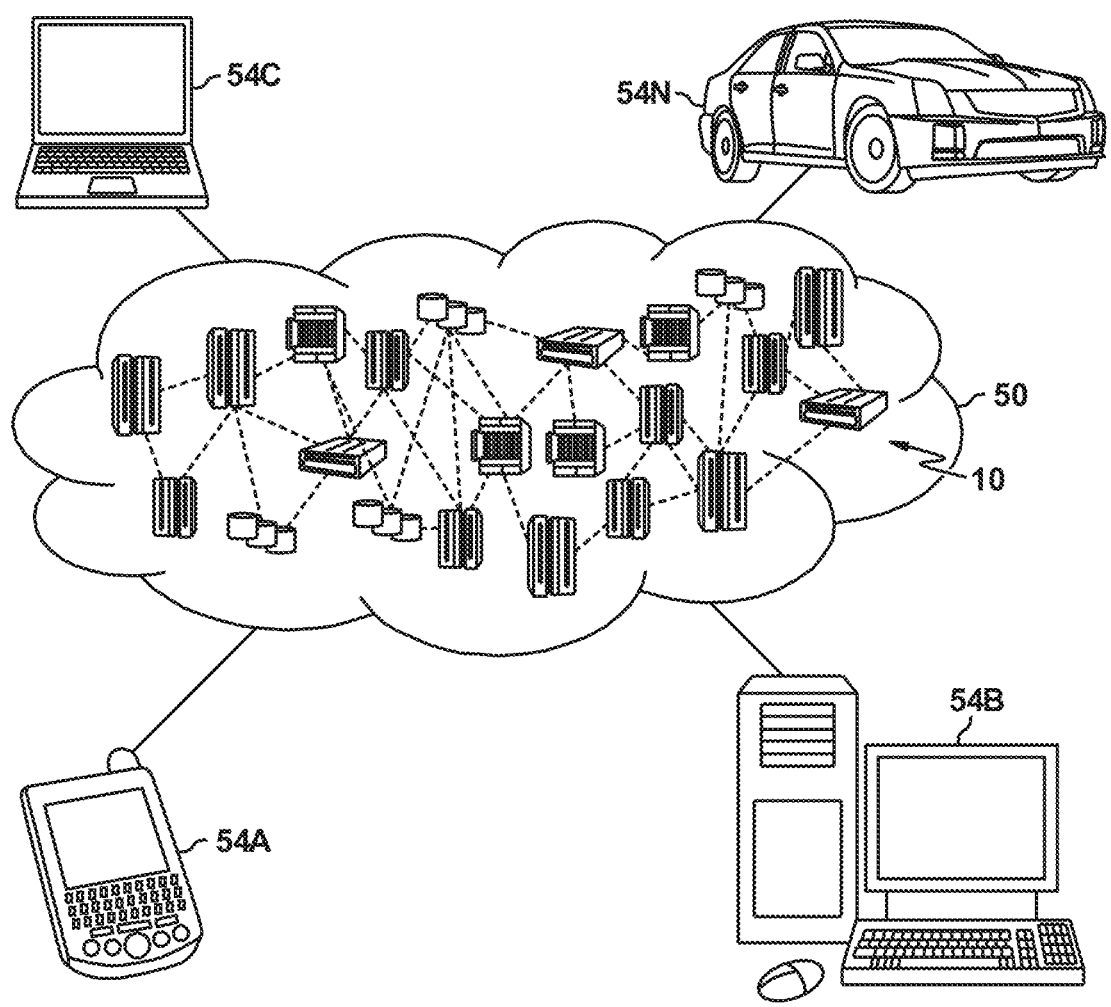
FIG. 1 depicts a cloud computing environment according to an embodiment of the present invention.

Embodiments of the present invention relate to reducing the risks presented by emergency lights to drivers of vehicles approaching the emergency lights. Certain aspects of the invention may be implemented using "cloud computing" to process data related to any one or more of the drivers, the lights, and the vehicles.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
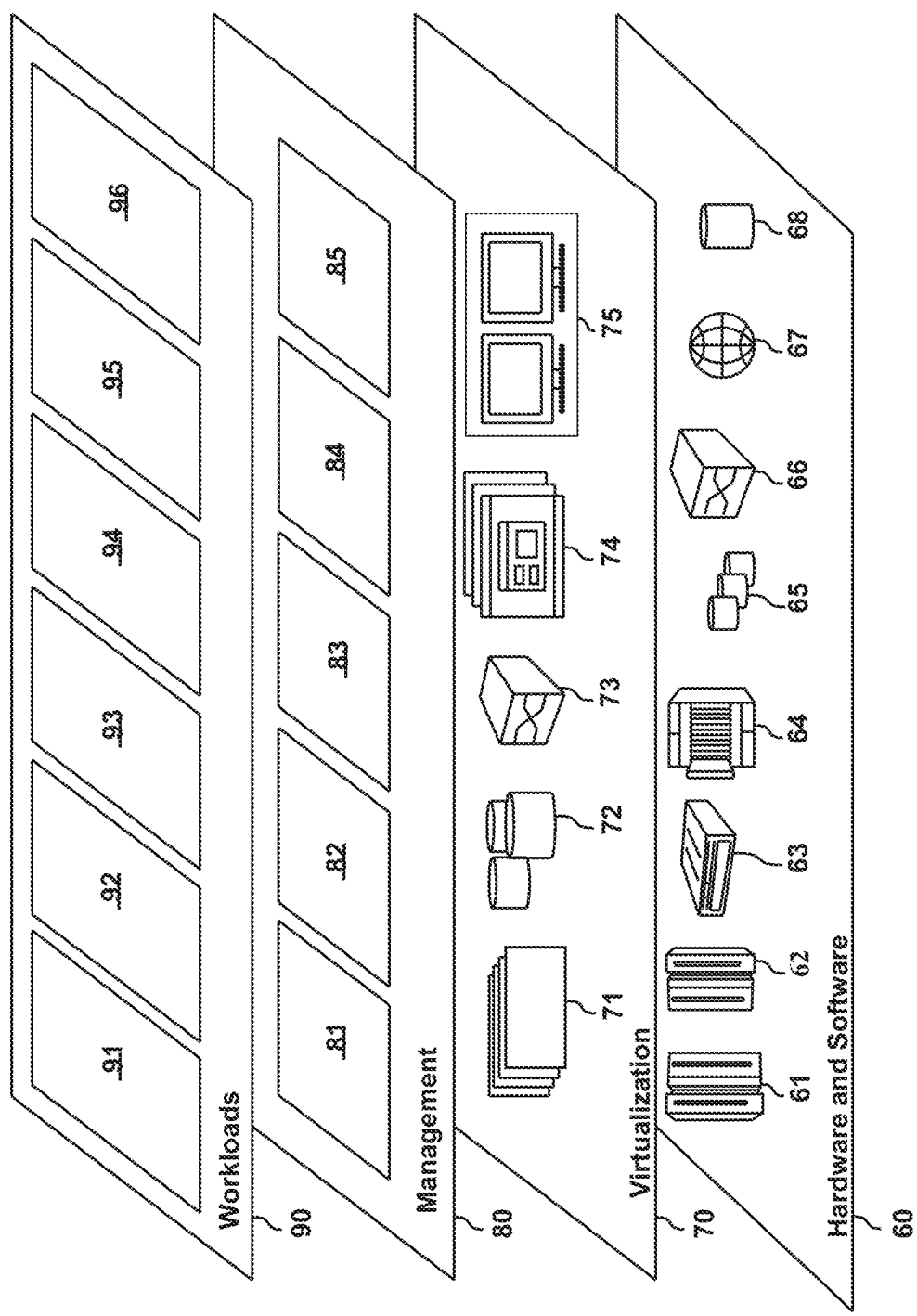
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a system 96 for automatically mitigating the effects of emergency vehicle lights on drivers. In one or more embodiments, the system 96 may be implemented by a standalone computer, for example, a computer located within an emergency vehicle 102. However, the system 96 can be implemented "in the cloud" for convenience, or partially standalone and partially in the cloud.

Figure 3:
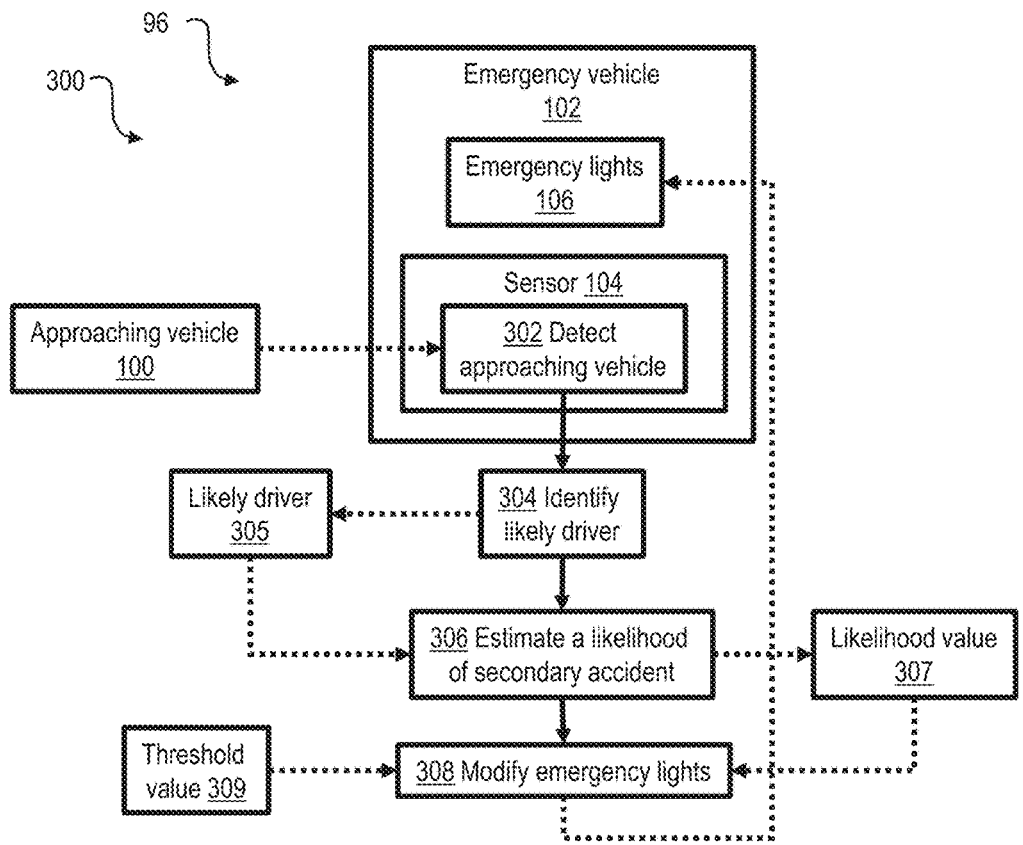
FIG. 3 depicts a method for reducing risks from emergency vehicle lights, according to an exemplary embodiment.
Figure 4:
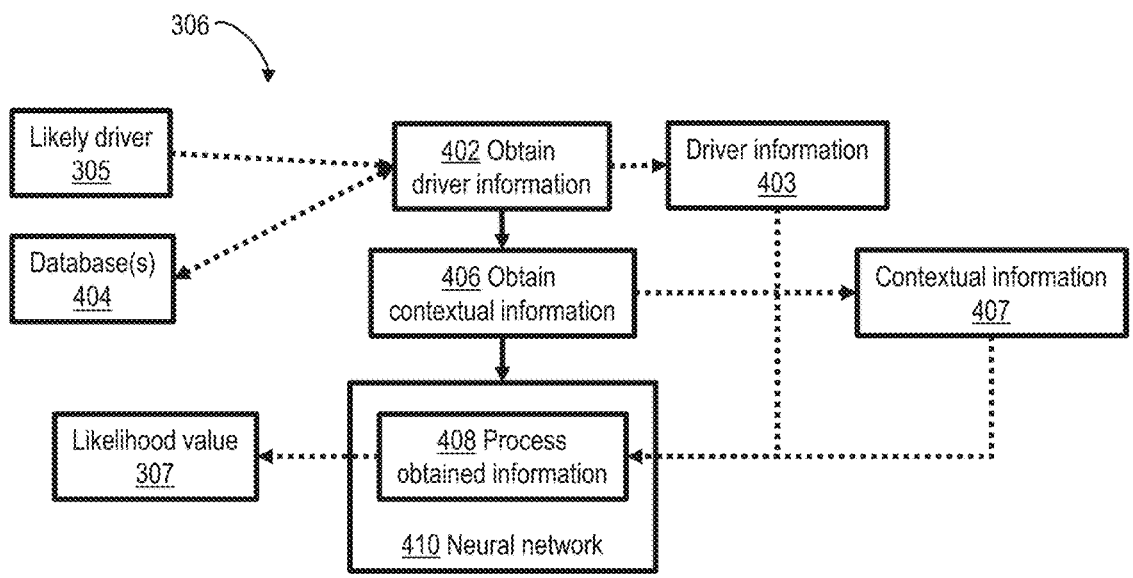
FIG. 4 depicts a method for estimating a likelihood that a driver will cause a further incident.
Figure 6:
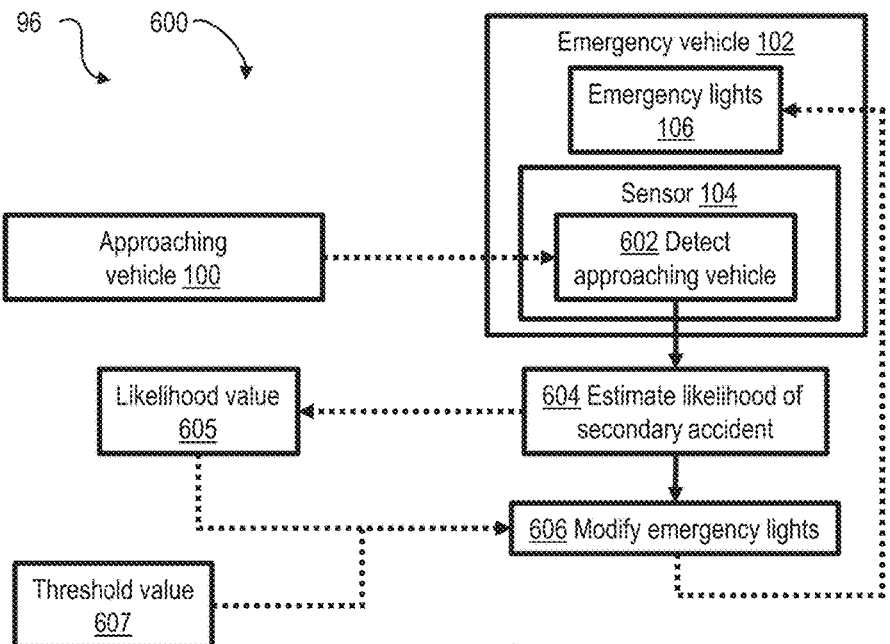
FIG. 6 depicts a method for reducing risks from emergency vehicle lights, according to an exemplary embodiment.
Figure 8:
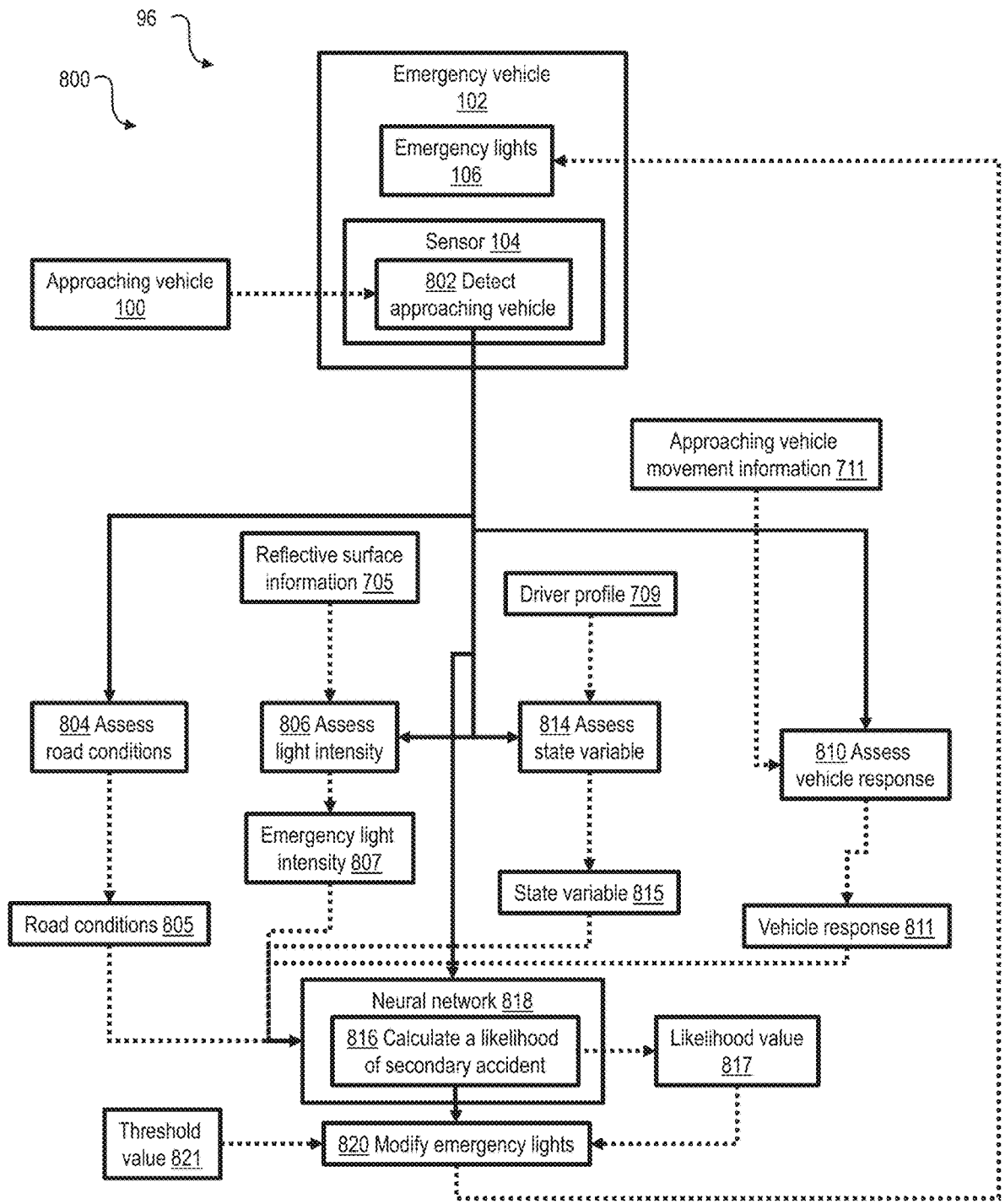
FIG. 8 depicts a method for reducing risks from emergency vehicle lights, according to an exemplary embodiment.

As one aspect of the invention the system 96 facilitates an exemplary method 300, as shown in FIG. 3. The depictions in FIGS. 3, 6, and 8 are equally applicable to standalone or partially standalone systems. The method 300 includes at 302 detecting one or more vehicles 100 that are approaching an emergency vehicle 102, using a sensor 104 of the emergency vehicle 102 (e.g., a sensor mounted on the emergency vehicle or a sensor connected wirelessly in communication with the emergency vehicle). Then at 304, identify a likely driver (or drivers) 305 of the approaching vehicle, and at 306, estimate a likelihood value 307 that the likely driver will cause a further incident. The step 306 of estimating the likelihood value 307 includes, as shown in FIG. 4: (i) at 402, obtaining driver information 403 associated with the likely driver 305 by electronically accessing one or more databases 404 including insurance claim records, news stories, arrest reports, speeding records, accident reports and demographic information; (ii) at 406, obtaining contextual information 407 that includes weather conditions and time of day; and (iii) at 408, processing the obtained information in a neural network 410 that is trained on historical information (e.g., the identities and driving profiles of drivers involved in accidents, the weather conditions and road conditions concurrent with accidents) to estimate the likelihood value 307 from a priori information (e.g., an identity and profile of a current driver, current weather, lighting and road conditions). Referring again to FIG. 3, the method 300 also includes at 308, in response to the likelihood value 307 exceeding a threshold value 309, modifying the emergency lights 106 of the emergency vehicle 102.

Figure 5:
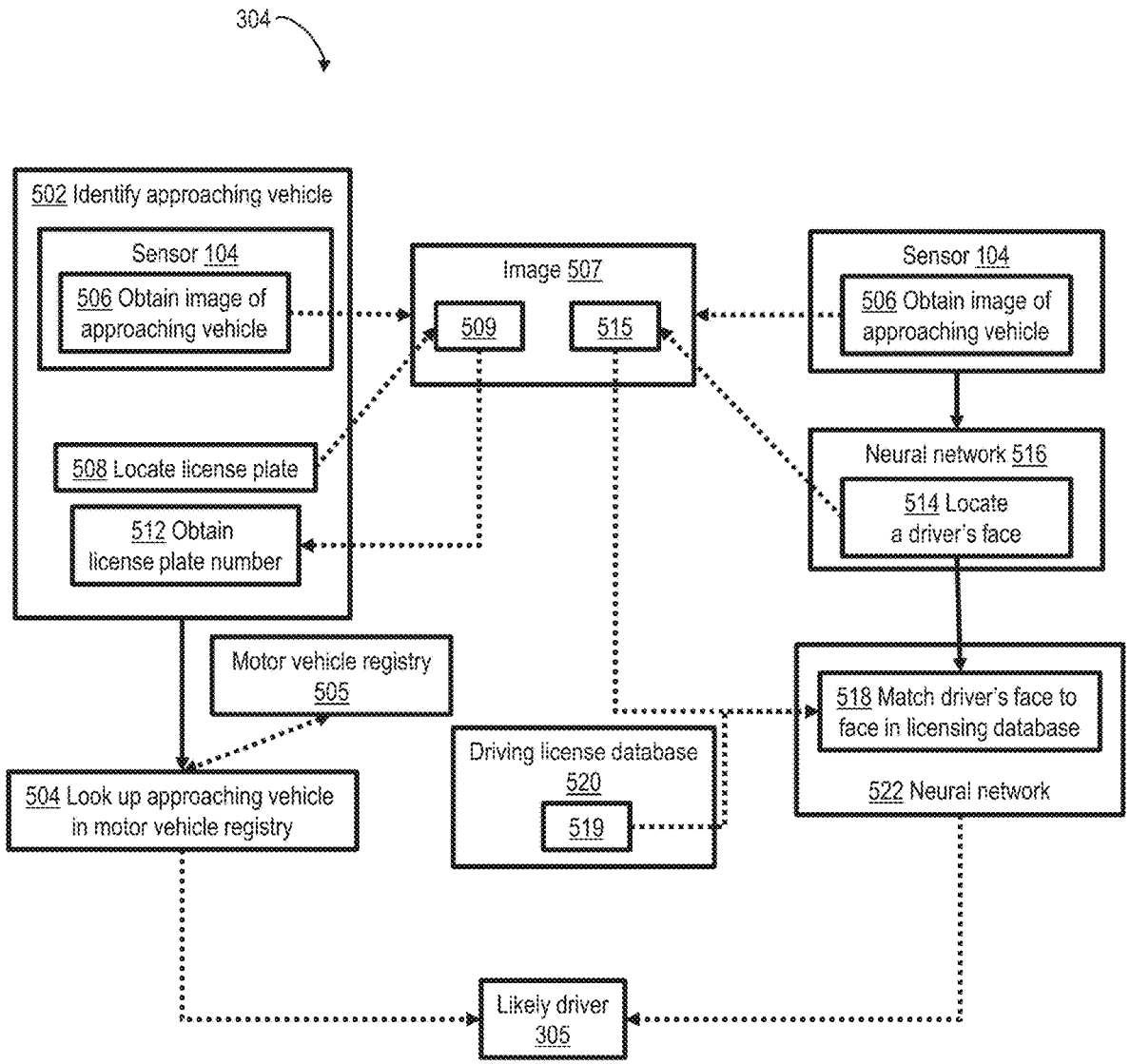
FIG. 5 depicts methods for identifying a likely driver of an approaching vehicle.

In one or more embodiments, the sensors of the emergency vehicle include at least one sensor selected from a list consisting of: a camera, a radar, and a microphone. In one or more embodiments, as shown in FIG. 5, identifying the likely driver at 304 (in order to locate and match the driver's profile in an electronic database such as a driver licensing database, an accident database, or an insurance claims database) includes at 502 identifying the approaching vehicle 100 and at 504 looking up the ownership of the approaching vehicle in a motor vehicle registry 505. In one or more embodiments, for example, identifying the approaching vehicle 100 includes at 506 obtaining an image 507 of the approaching vehicle using a sensor 104 of the emergency vehicle 102, at 508 locating a license plate 509 in the image using a first neural network 516, and at 512 obtaining a license plate number by performing optical character recognition on the license plate. In one or more embodiments, as also shown in FIG. 5, identifying the likely driver at 304 includes at 506 obtaining an image 507 of the approaching vehicle using a camera of the emergency vehicle, at 514 locating a driver's face 515 in the image 507 using a first neural network 516, and at 518 matching the driver's face 515 to a stored image 519 within a driving license database 520 using a second neural network 522. In one embodiment, locating and matching a driver profile includes locating the driver's face 515 within the image 507 and matching the driver's face with a stored image 519 within the driving license database and matching with the driver's unique identity. In one example, the driver unique identity is a unique summary of the driver's driving behavior computed from historical driving data using a machine learning algorithm.

In one or more embodiments, the likelihood value 307 and the threshold value 309 are numerical values.

In one or more embodiments, modifying the emergency lights 106 includes changing a temporal pattern of the emergency lights from flashing to steady. In one or more embodiments, modifying the emergency lights 106 includes dimming the emergency lights or reducing the number of emergency lights.

According to another aspect, an exemplary method 600, as shown in FIG. 6, includes at 602 detecting a vehicle 100 that is approaching an emergency vehicle 102, using a sensor 104 of the emergency vehicle 102. Then at 604 the method 600 includes estimating a likelihood value 605 that the approaching vehicle 100 will initiate a road accident, possibly involving the emergency vehicle 102 or nearby people; and, at 606, in response to the likelihood value 605 exceeding a threshold value 607, modifying emergency lights 106 of the emergency vehicle 102.

Figure 7:
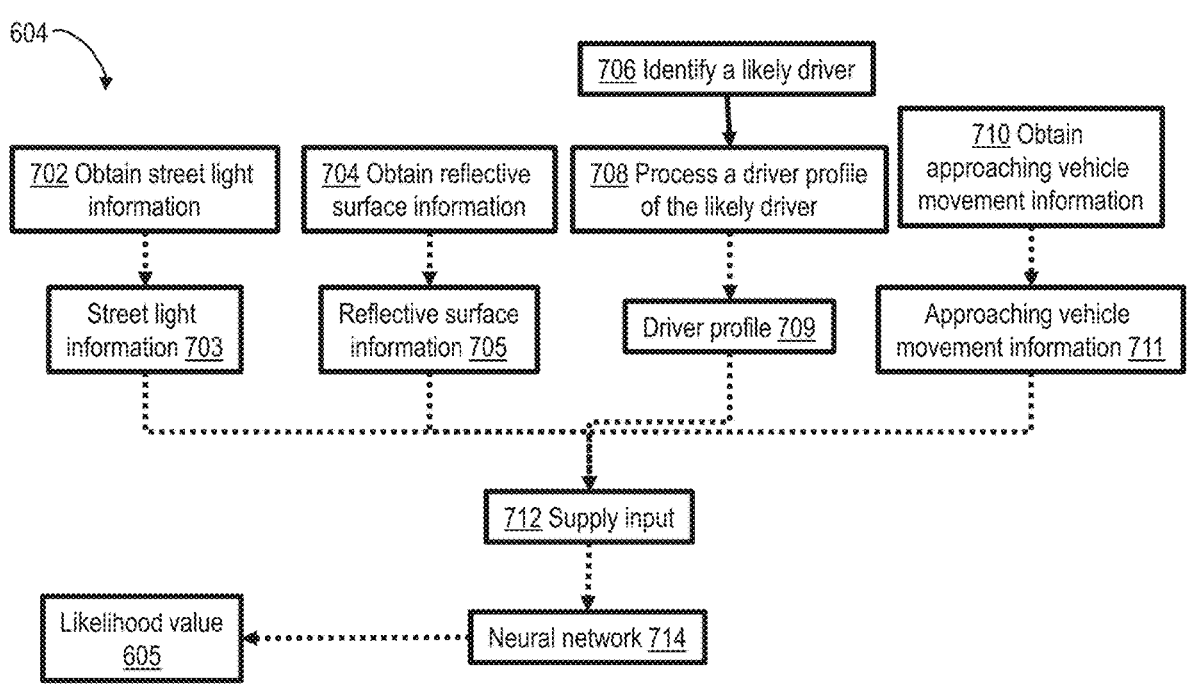
FIG. 7 depicts a method for estimating a likelihood of a secondary accident.

Referring to FIG. 7, in one or more embodiments, estimating the likelihood value 605 at 604 includes at 702 obtaining street light information 703 by determining intensity, number, and distance of street lights from the emergency vehicle or the approaching vehicle. In one or more embodiments, estimating the likelihood value 605 at 604 includes at 704 obtaining reflective surface information 705 by determining location, orientation, and velocity of one or more reflective surfaces within a pre-determined distance from the emergency vehicle. These can include the approaching vehicle's windshield, wet roadways, etc. In one or more embodiments, estimating the likelihood value 605 at 604 includes at 706 identifying a likely driver of the approaching vehicle and at 708 processing a driver profile 709 of the likely driver. In one or more embodiments, estimating the likelihood value 605 at 604 includes at 710 obtaining via the sensor of the emergency vehicle information 711 about the approaching vehicle's movement relative to the centerline of a road on which the approaching vehicle is travelling. In one or more embodiments, estimating the likelihood value 605 at 604 includes at 712 supplying at least one of street light information 703, reflective surface information 705, driver profile information 709, and approaching vehicle movement information 711 as input to a neural network 714 that is trained to estimate likelihood of an accident in response to such information.

According to another aspect, a method 800 as shown in FIG. 8 includes, at 802, detecting a vehicle 100 approaching an emergency vehicle 102, which is displaying emergency lights 106, using a sensor 104 of the emergency vehicle. The method 800 also includes, at 804, assessing road conditions 805 affecting the approaching vehicle; at 806, assessing the intensity 807 of the emergency lights at the approaching vehicle, in response to information 705 regarding the location, orientation, and velocity of one or more reflective surfaces; at 810, assessing a response 811 of the approaching vehicle to the emergency lights, in response to information regarding the location, orientation, and velocity of the approaching vehicle (approaching vehicle movement and maneuver information 711); and at 814, assessing a state variable 815 related to a driver of the approaching vehicle. For example, the state variable 815 can incorporate information from the driver profile 709.

The assessment of road conditions can be accomplished, in one or more embodiments, using remote sensors or data, e.g., Internet-of-Things (IoT) sensors or broadcast weather data or road repair data. The reflective surface information 705 and the approaching vehicle movement information 711 can be gathered, in one or more embodiments, by sensors of the emergency vehicle 102 or of the approaching vehicle 100 or by other sensors such as fixed mount security cameras, etc. The state variable 815 can be gathered, in one or more embodiments, by sensors of the approaching vehicle 100.

Based on the above assessments, the method 800 includes at 816 calculating a likelihood value 817 that the approaching vehicle 100 will initiate an accident, by supplying information about the road conditions 805, the intensity 807 of the emergency lights at the approaching vehicle, the response 811 of the approaching vehicle, and the state variable 815 as inputs to a neural network 818 that is trained to correlate accidents to such information. The method 800 further includes, at 820, in response to the likelihood value 817 exceeding a threshold value 821, modifying the emergency lights 106. In one or more embodiments, modifying the emergency lights includes dimming the emergency lights for a specified duration of time.

Thus, in one aspect, the system 96 automatically adjusts the illumination (flashing pattern and/or intensity or dimness) of emergency lights 106, in response to a profile 709 of a driver of an approaching vehicle 100, in order to reduce the roadside distraction that these bright lights present to the driver.

In one or more embodiments, profile information 709 for a driver includes attributes such as age, experience, visual acuity, history of accidents, history of infractions.

In one or more embodiments, at 406 and/or 804 the system 96 also accounts for environmental factors which could reduce visibility, such as the weather (rain, snow, fog), and contextual factors such as surrounding conditions like reflective objects/surfaces which could reduce visibility such as a dirty windshield. For example, the system 96 determines a degree of visibility reduction to a driver of an approaching vehicle 100, based on analysis of the effect of lights 106 from one or more emergency vehicle(s), analysis of environmental factors, analysis of contextual factors. The determined degree of visibility, coupled with analysis of the driver profile, aids in assessing the likelihood of a secondary accident caused by the lights 106.

In one or more embodiments, the system 96 detects one or more vehicles 100 approaching one or more emergency vehicles 102 (alternatively, one or more emergency vehicles approaching one or more vehicles) and then predicts the degree of visibility reduction to the driver(s) of the vehicle(s) using a neural network model 410 that was trained on data from real-time analysis of environmental factors, contextual factors, driver profile and historical data. In one or more embodiments, the system 96 generates a visibility profile for a given location or area. The visibility profile includes crowdsourced analysis of light sources 703 (e.g., street lights, crowd vehicles) and of reflective surfaces 705 such as windshields, glasses, roofs, roads, or any other reflective stationary or temporary objects, as well as combined effects when lights reflect on one or more of these stationary or temporary objects. The crowdsourced analysis detects the lights and the reflective surfaces using, for example, satellite imagery and/or other ecosystems of edge computing devices or sensors (e.g., dashcams, bodycams, mobile phone cameras) in the vicinity.

One or more embodiments detect and/or predict various factors associated with lights that may cause roadside incidents, using machine learning algorithms. For example, deep learning models can be used to characterize street light information 703 including the number of street lights, their location, their brightness/intensity level, reflective surface information 705 for the roads, buildings, other cars, etc. and other contextual factors such as the driver's visual acuity and profiles of nearby drivers. In one or more embodiments, the system 96 employs one or more feature-level data fusion methods with environmental and other contexts, e.g., using a deep neural network (DNN). Exemplary datasets include data collected from various online databases of street light locations and conditions, Google Street View, geospatial-temporal data (e.g., maps, satellite, weather, drone, Internet-of-Things (IoT)), meteorological data, and crowd-sourced images. The system 96 can select distraction-related data by conducting statistical analyses prior to generating training data to train the DNN model. In one or more embodiments, the DNN model includes the following layers: spatial, temporal, environmental context, user profile context, and joint feature representation layers.

Generally, a neural network includes a plurality of computer processors that are configured to work together to implement one or more machine learning algorithms. The implementation may be synchronous or asynchronous. In a neural network, the processors simulate thousands or millions of neurons, which are connected by axons and synapses. Each connection is enforcing, inhibitory, or neutral in its effect on the activation state of connected neural units. Each individual neural unit has a summation function which combines the values of all its inputs together. In some implementations, there is a threshold function or limiting function on at least some connections and/or on at least some neural units, such that the signal must surpass the limit before propagating to other neurons. A neural network can implement supervised, unsupervised, or semi-supervised machine learning.

Through the analysis of the detected or predicted factors that may cause a driving distraction to one or more drivers and analysis of each driver's profile 709, the system 96 performs a cause-effect analysis to estimate the likelihood of a secondary accident.

The predicted likelihood of a secondary accident can be based on the movement of a vehicle 100 approaching the emergency vehicle(s) 102 (e.g., location, speed/acceleration of the approaching vehicle 100), movement of nearby vehicles (e.g., location, speed/acceleration of the nearby vehicles), driver engagement with the approaching vehicle 100 (e.g., the driver driving behavior such as how the driver is steering the car to maneuver, harsh braking, drivers hands movement to cover eyes, verbal acknowledgement of the emergency vehicle, distraction from vehicle occupants, and other sensor data from the vehicle), properties/characteristics of the nearby drivers and their vehicles, analysis of surrounding or nearby objects, the driver contextual factors, the direction of the vehicle, the direction of the emergency vehicles, etc.

One or more embodiments of the system 96 automatically identifies potentially unsafe conditions (e.g., driving conditions, environmental conditions, vehicle conditions, numbers of occupants, etc.) to predict the occurrence of secondary accidents by analyzing various light sources, coupled with factors discussed above. The system monitors current events derived from continuous sensor streams (e.g., accelerometer, GPS, proximity sensor, video feed, etc.). The current event data is related to metadata describing lighting (from various light sources), driving, environment, and context associated with events occurring or about to occur at a road being travelled by a vehicle approaching one or more emergency vehicles. The system 96 cross-references the current event data with previous event data that describes a set of previous events associated with a previously identified set of accidents in similar situations. In response to detecting events in the current event data that correspond to at least one event in the set of previous events, in one or more embodiments the system 96 generates an alert (e.g., notification to the approaching vehicle and/or to the emergency vehicle or to respective operators of the vehicles) identifying a potential occurrence of the secondary road accident due to various light sources, coupled with factors discussed above.

In another embodiment, the system 96 determines a likelihood of a secondary accident using parameters regarding the movement status of the vehicle, analysis of user profile, including current cognitive state of the driver, the number of vehicle occupants, etc.

In one or more embodiments, the system 96 dims a set of emergency lights 106 when the system 96 estimates an undesirably high likelihood of a secondary accident due to the presence of the emergency lights. For example, a driver's profile 709 indicates a higher than acceptable risk for the driver for being involved in a secondary accident and this driver's vehicle is approaching an emergency scene with emergency lights.

In another embodiment, the emergency lights 106 are dimmed (or turned off for one half a revolution, in the case of a revolving light) after an approaching vehicle 100 has passed the emergency scene as the bright lights do not need to warn drivers of receding cars.

In one or more embodiments, a method that is implemented by the system 96 includes training a reinforcement learning algorithm (e.g., using Monte Carlo Control with Epsilon-Greedy Policies algorithm) to generate risk-avoidance actions given the likelihood of a secondary accident, the current context of the driver, approaching vehicle state, road condition, etc. Exemplary actions include recommending drivers to stop for a short duration, sending an alert/signal to the emergency vehicles to dim their lights, communicating the potential risk of light sources to the light generating emergency vehicles and/or devices or authorities, controlling one or more properties of the approaching vehicle, etc. The controlling action further including one or more properties/device/sensor of the vehicle (e.g., controlling the movement of the vehicle such as speed/acceleration, position of driving) to minimize or reduce risks that might be caused by the emergency lights. For example, the controlling action may be switching from non-self-driving mode to self-driving mode if available in the vehicle. In another embodiment, in the case where multiple emergency vehicles are present at the scene of an accident, the emergency lights of one or more vehicles could be turned off without compromising the safety of the emergency workers. In further embodiment, the occupants of the vehicle will be alerted via a "voice command" to take remedial actions for avoiding a secondary accident.

In yet another embodiment, IoT sensors can be employed to determine whether the driver of the approaching vehicle responds to the emergency lights (i.e., by slowing down, discussing them with a passenger, looking in the direction of them), and if a response is above a threshold, then reduce the number or brightness of the lights, dynamically (as the cars approach) and return them to their previous status for the next car or groups of cars.

Figure 9:
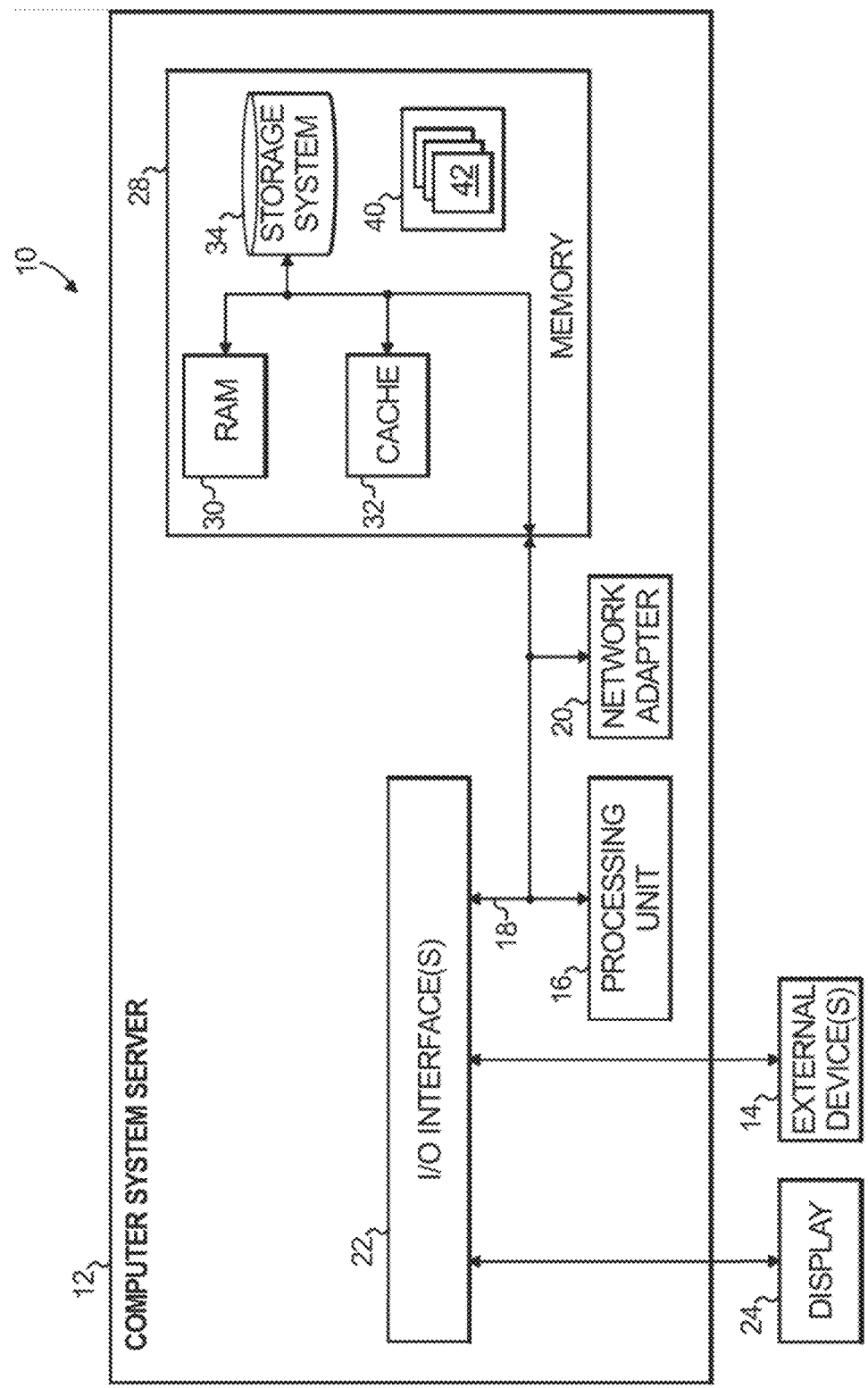
FIG. 9 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps, or in the form of a non-transitory computer readable medium embodying computer executable instructions which when executed by a computer cause the computer to perform exemplary method steps. FIG. 9 depicts a computer system that may be useful in implementing one or more aspects and/or elements of the invention, also representative of a cloud computing node according to an embodiment of the present invention. Referring now to FIG. 9, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/ server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 9, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 9) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   detecting a vehicle that is approaching an emergency vehicle, using at least one sensor of the emergency vehicle;
   identifying a likely driver of the approaching vehicle;
   estimating a likelihood value that the likely driver will cause a further incident, wherein the step of estimating comprises (i) obtaining driver information, (ii) obtaining contextual information that comprises weather conditions and time of day, and (iii) processing the obtained information in a neural network that is trained on historical information to estimate the likelihood from a priori information; and,
   in response to the likelihood value exceeding a threshold value, modifying emergency lights of the emergency vehicle.

2. The method of claim 1 wherein the at least one sensor of the emergency vehicle comprises at least one sensor selected from a list consisting of: a camera, a radar, and a microphone.

3. The method of claim 1 wherein identifying the likely driver comprises identifying the approaching vehicle and looking up the profile of the approaching vehicle in a motor vehicle registry.

4. The method of claim 3 wherein the at least one sensor includes a camera, and wherein identifying the approaching vehicle comprises obtaining an image of the approaching vehicle using the camera of the emergency vehicle, locating a license plate in the image using a neural network, obtaining a license plate number by performing optical character recognition on the license plate, and searching the motor vehicle registration database using the license plate number.

5. The method of claim 1 wherein the at least one sensor includes a camera, and wherein identifying the likely driver comprises obtaining an image of the approaching vehicle using a camera of the emergency vehicle, locating a driver's face in the image using a first neural network, and matching the driver's profile within a driving license database using a second neural network.

6. The method of claim 1 wherein the likelihood value and the threshold value are numerical values.

7. The method of claim 1 wherein modifying the emergency lights comprises changing a temporal pattern of the emergency lights from flashing to steady.

8. The method of claim 1 wherein modifying the emergency lights comprises dimming the emergency lights.

9. A method comprising:
   detecting a vehicle that is approaching an emergency vehicle, using a sensor of the emergency vehicle;
   estimating a likelihood value that the approaching vehicle will initiate a road accident; and,
   in response to the likelihood value exceeding a threshold value, modifying emergency lights of the emergency vehicle.

10. The method of claim 9 wherein estimating the likelihood value comprises determining intensity, number, and distance of street lights from the emergency vehicle.

11. The method of claim 9 wherein estimating the likelihood value comprises determining location, orientation, and velocity of one or more reflective surfaces within a pre-determined distance from the emergency vehicle.

12. The method of claim 9 wherein estimating the likelihood value comprises identifying a likely driver of the approaching vehicle and processing a driver profile of the likely driver.

13. The method of claim 12 wherein identifying the likely driver comprises identifying the approaching vehicle and looking up ownership of the approaching vehicle in a motor vehicle registry.

14. The method of claim 13 wherein the sensor includes a camera, and wherein identifying the approaching vehicle comprises obtaining an image of the approaching vehicle using the camera of the emergency vehicle, locating a license plate in the image using a neural network, obtaining a license plate number by performing optical character recognition on the license plate, and searching the motor vehicle registration database using the license plate number.

15. The method of claim 12 wherein the sensor includes a camera, and wherein identifying the likely driver comprises obtaining an image of the approaching vehicle using the camera of the emergency vehicle, locating a driver's face in the image using a first neural network, and matching the driver's face in the image to a face within a driving license database using a second neural network.

16. The method of claim 9 wherein estimating the likelihood value comprises detecting and analyzing, by a neural network, a response to the emergency lights by a driver of the approaching vehicle.

17. The method of claim 9 wherein estimating the likelihood value comprises obtaining via the sensor of the emergency vehicle information about the approaching vehicle's movement relative to the centerline of a road on which the approaching vehicle is travelling.

18. The method of claim 9 wherein estimating the likelihood value comprises supplying at least one of street light information, reflective surface information, driver profile information, and approaching vehicle movement information as input to a neural network that is trained to estimate likelihood of an accident in response to such information.

19. A method comprising:
detecting a vehicle approaching an emergency vehicle that is displaying emergency lights;
assessing road conditions affecting the approaching vehicle;
assessing intensity of the emergency lights at the approaching vehicle, in response to information regarding the location, orientation, and velocity of one or more reflective surfaces;
assessing a response of the approaching vehicle to the emergency lights, in response to information regarding the location, orientation, and velocity of the approaching vehicle;
assessing a state variable related to a driver of the approaching vehicle;
obtaining a likelihood value that the approaching vehicle will initiate an accident, by supplying information about the road conditions, the intensity of the emergency lights at the approaching vehicle, the response of the approaching vehicle, and the state variable as inputs to a neural network trained to correlate accidents to such information; and,
in response to the likelihood value exceeding a threshold value, modifying the emergency lights.

20. The method of claim 19 wherein modifying the emergency lights comprises dimming the emergency lights.

\* \* \* \* \*